(12) United States Patent
Sheridan et al.

(10) Patent No.: US 8,511,435 B2
(45) Date of Patent: *Aug. 20, 2013

(54) LUBRICATION SYSTEM WITH EXTENDED EMERGENCY OPERABILITY

(75) Inventors: William G. Sheridan, Southington, CT (US); Lawrence E. Portlock, Bethany, CT (US); Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/213,048

(22) Filed: Aug. 18, 2011

(65) Prior Publication Data

US 2011/0297485 A1 Dec. 8, 2011

Related U.S. Application Data

(63) Continuation of application No. 11/603,393, filed on Nov. 22, 2006, now Pat. No. 8,020,665.

(51) Int. Cl.
*F01M 1/18* (2006.01)
*F16H 57/04* (2010.01)

(52) U.S. Cl.
USPC .......................................... 184/6.12; 184/6.4

(58) Field of Classification Search
USPC ...... 184/6.4, 6.12, 7.4, 11.1, 11.2; 74/606 R; 475/159, 160, 330, 331, 332, 348; 137/112, 137/115.6, 172
See application file for complete search history.

(56) References Cited

U.S. PATENT DOCUMENTS

| 1,631,537 A | 6/1927 | Krenzke |
| 2,370,484 A | 2/1945 | Nabstedt |
| 2,373,350 A | 4/1945 | Walsh |
| 2,575,986 A | 11/1951 | Schou |
| 2,684,591 A | 7/1954 | Lundquist |
| 2,782,658 A | 2/1957 | Schaefer et al. |
| 3,023,640 A | 3/1962 | Schou |
| 3,049,138 A | 8/1962 | Klank, Jr. |
| 3,533,307 A | 10/1970 | Gunderson |
| 3,776,067 A | 12/1973 | DeBruyne et al. |
| 4,023,548 A | 5/1977 | Prasch |
| 4,153,141 A | 5/1979 | Methlie |

(Continued)

FOREIGN PATENT DOCUMENTS

| EP | 0717175 | 6/1996 |
| JP | 51140013 | 12/1976 |

(Continued)

OTHER PUBLICATIONS

Extended EP Search Report, dated Jan. 28, 2011, Application No. 07254551.0-1263/1925856.

(Continued)

*Primary Examiner* — William E Dondero
*Assistant Examiner* — Robert T Reese
(74) *Attorney, Agent, or Firm* — Carlson, Gaskey & Olds, P.C.

(57) ABSTRACT

A lubrication system, includes an auxiliary lubricant tank 48 and a supply conduit 58 extending from a source of lubricant 26 and through the auxiliary lubricant tank. A portion of the conduit resides within the tank and has an opening 136 for allowing lubricant transfer between the tank and the conduit.

21 Claims, 7 Drawing Sheets

(56) References Cited

U.S. PATENT DOCUMENTS

| | | | | |
|---|---|---|---|---|
| 4,249,783 | A | 2/1981 | Glassmeyer | |
| 4,284,174 | A | 8/1981 | Salvana et al. | |
| 4,329,952 | A | 5/1982 | Buraas | |
| 4,346,786 | A | 8/1982 | Midgley | |
| 4,373,421 | A | 2/1983 | Camboulives et al. | |
| 4,378,711 | A | 4/1983 | Daniel | |
| 4,589,826 | A | 5/1986 | Zimmern et al. | |
| 4,650,367 | A * | 3/1987 | Dietzler | 405/43 |
| 4,691,119 | A | 9/1987 | McCabria | |
| 4,704,862 | A | 11/1987 | Dennison et al. | |
| 4,717,000 | A | 1/1988 | Waddington et al. | |
| 4,858,427 | A | 8/1989 | Provenzano | |
| 4,882,943 | A | 11/1989 | Pipon et al. | |
| 4,888,947 | A | 12/1989 | Thompson | |
| 4,976,335 | A | 12/1990 | Cappellato | |
| 5,018,601 | A | 5/1991 | Waddington et al. | |
| 5,046,306 | A | 9/1991 | Borre, Jr. | |
| 5,102,379 | A | 4/1992 | Pagluica et al. | |
| 5,121,815 | A | 6/1992 | Francois et al. | |
| 5,167,207 | A | 12/1992 | Gohara | |
| 5,176,039 | A | 1/1993 | Takeuchi et al. | |
| 5,245,820 | A * | 9/1993 | Zalewski et al. | 60/39.08 |
| 5,251,725 | A | 10/1993 | Barrett, Jr. | |
| 5,472,383 | A | 12/1995 | McKibbin | |
| 6,039,667 | A | 3/2000 | Schunck et al. | |
| 6,223,616 | B1 * | 5/2001 | Sheridan | 74/468 |
| 6,463,819 | B1 | 10/2002 | Rago | |
| 8,020,665 | B2 * | 9/2011 | Sheridan et al. | 184/6.12 |
| 2002/0083983 | A1 | 7/2002 | Coha et al. | |
| 2003/0230274 | A1 | 12/2003 | Williams et al. | |
| 2005/0274349 | A1 | 12/2005 | Lee | |

FOREIGN PATENT DOCUMENTS

| | | |
|---|---|---|
| JP | 53130601 | 10/1978 |
| JP | 60097312 | 5/1985 |
| JP | 61067815 | 5/1986 |
| JP | 2002089225 | 3/2002 |

OTHER PUBLICATIONS

Partial European Search Report, mailed Jul. 29, 2010, Application No. 07254551.0-1263/1925856.

European Search Report, mailed Jul. 8, 2010, Application No. 07254542.9-1263/1925885.

* cited by examiner

LUBRICATION SYSTEM WITH EXTENDED EMERGENCY OPERABILITY

REFERENCE TO RELATED APPLICATIONS

This application is a continuation application of U.S. patent application Ser. No. 11/603,393, which was filed Nov. 22, 2006 now U.S. Pat. No. 8,020,665. Application Ser. No. 11/603,393 includes subject matter in common with application Ser. No. 11/603,664 entitled "Lubrication System with Tolerance for Reduced Gravity." application Ser. Nos. 11/603,393 and 11/603,664 are both assigned to, or under obligation of assignment to, United Technologies Corporation.

BACKGROUND

This invention relates to a lubrication system capable of operating satisfactorily for a limited time during reduced gravity (reduced-G) conditions, particularly negative-G and zero-G conditions.

Aircraft gas turbine engines include various components requiring lubrication. A main lubrication system normally provides lubricant to these components. It is desirable to also provide an emergency lubrication capability so that at least some components can be lubricated, at least temporarily, if the main lubrication system fails or operates abnormally. Irrespective of whether the main lubrication system is operating normally or not, it may also be desirable to ensure that components are not starved of lubricant during reduced-G conditions. Reduced-G conditions are those in which G, the acceleration due to gravity (9.8 meters/sec./sec.), is partially or entirely counteracted by aircraft maneuvers and/or aircraft orientation.

SUMMARY

A lubrication system includes an auxiliary lubricant tank and a conduit extending without interruption from a source of lubricant through the auxiliary lubricant tank. A portion of the conduit residing within the tank has an opening. The opening allows lubricant transfer between the tank and the conduit.

The foregoing and other features of the various embodiments of the lubrication system described herein will become more apparent from the following detailed description and the accompanying drawings.

DETAILED DESCRIPTION

Figure 1:
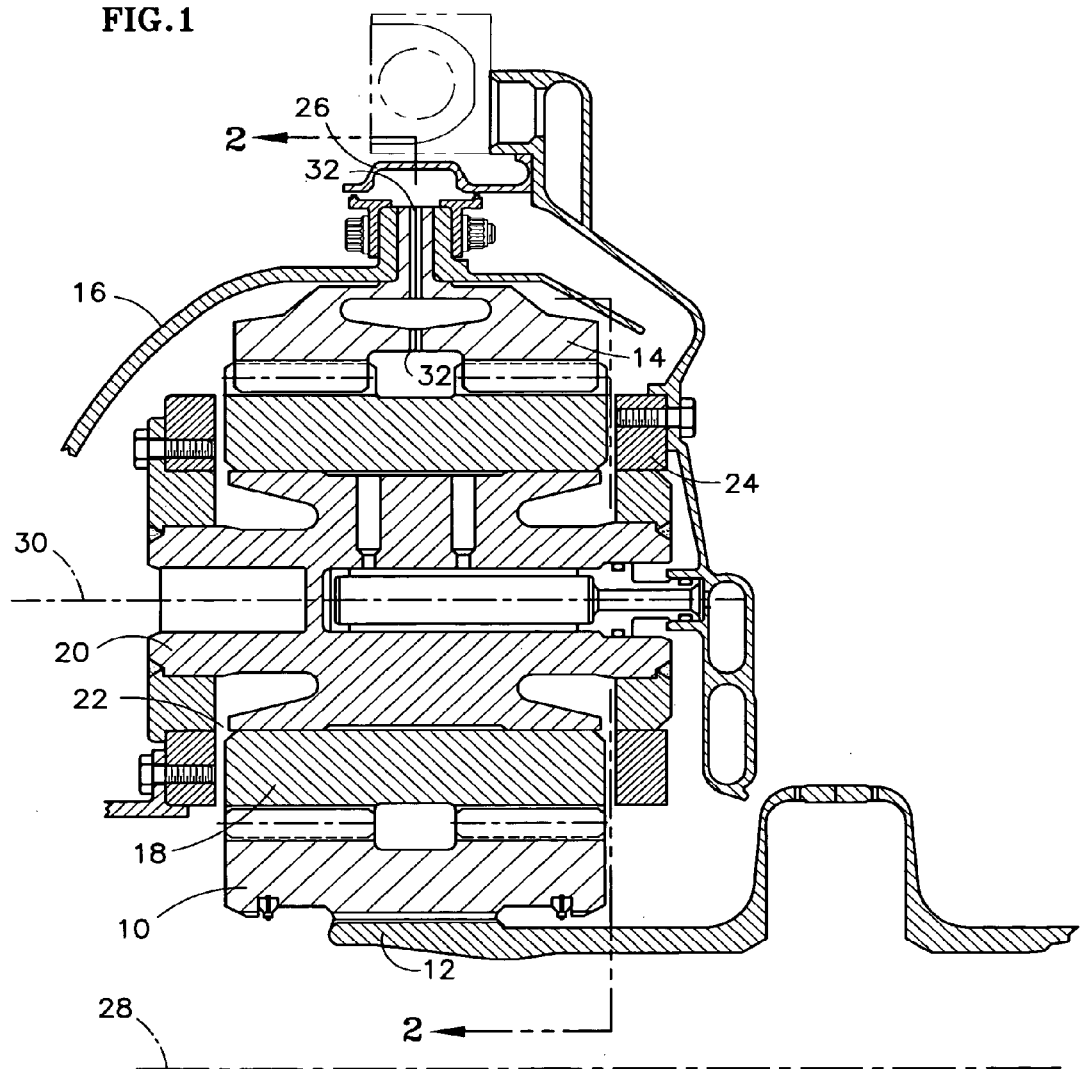
FIG. 1 is a cross sectional side elevation view of a gear train configured as a star system and useful in an aircraft gas turbine engine.
Figure 2:
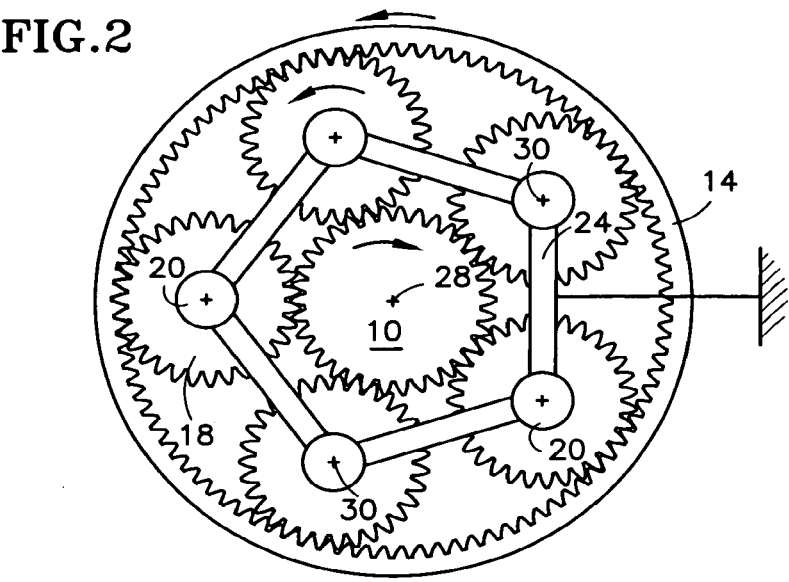
FIG. 2 is a schematic view in the direction 2-2 of FIG. 1.

Referring to FIGS. 1 and 2, a reduction gear train suitable for use in an aircraft gas turbine engine includes a sun gear 10 driven by a sun gear (input) shaft 12, a ring gear 14 radially outboard of the sun gear and connected to a ring gear (output) shaft 16, and a set of intermediate gears 18 radially intermediate and meshing with the sun and ring gears. Each intermediate gear circumscribes a journal pin 20. A thin, replenishable film of lubricant, not shown, occupies a small annular space 22 between each intermediate gear and its journal pin to support the intermediate gear. This arrangement is referred to as a journal bearing. The journal pins are all supported by a carrier 24. The carrier interconnects the journal pins with each other and, by doing so, also interconnects the intermediate gears to each other. A lubricant recovery gutter 26 circumscribes the ring gear.

In the gear train shown in FIGS. 1 and 2, the sun and ring gears are each rotatable about an axis 28. The carrier is non-rotatable even though the individual intermediate gears are each rotatable about their respective axes 30. Such a system is referred to as a star system. As seen best in FIG. 2, the input and output shafts counterrotate. Lubricant flows through the gear system to support the intermediate gears 18 on the journal pins 20 and to lubricate and cool the gear teeth. The used lubricant expelled by the gear train enters the gutter 26 by various paths, which include lubricant slots 32.

Figure 3:
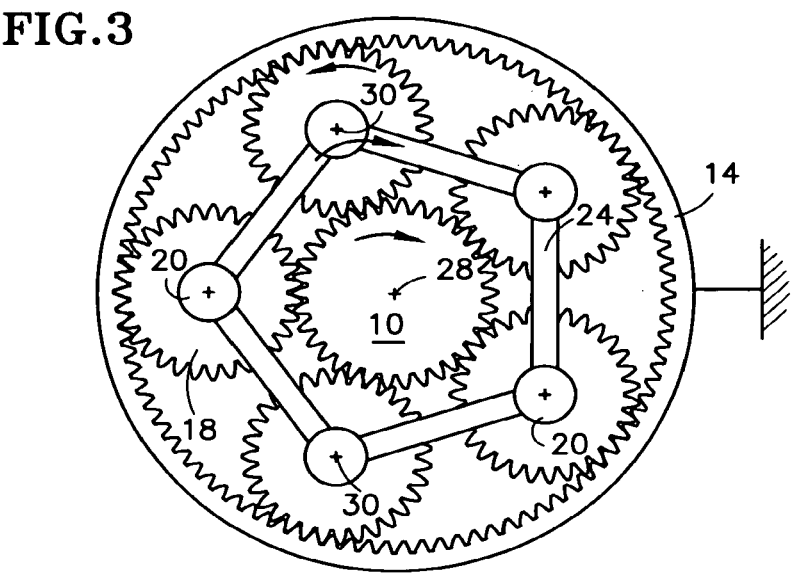
FIG. 3 is a schematic view similar to FIG. 2 illustrating a gear train configured as a planetary system.

Alternatively, as seen in FIG. 3, the sun gear and carrier are rotatable about the axis 28. The ring gear is non-rotatable. The carrier is connected to an output shaft. Such a system is referred to as a planetary system. The input and output shafts co-rotate as indicated in FIG. 3. Finally, all three components may be rotatable about axis 28 so that dual output shafts connected to the carrier and the ring gear counterrotate with respect to each other.

Many of the engine components, including the gears 10, 14, 18 are able to tolerate lubricant starvation for brief intervals of time. However the journal pins 20 are far less tolerant of lubricant starvation. Accordingly, whether the gear system is configured as a star, a planetary or with all three gears rotatable, it is desirable to ensure that lubricant flows to the journal pins, at least temporarily under all conditions. The temporary lubricant supply allows time for normal operation to resume or for the engine to be shut down before significant damage can occur.

Figure 4:
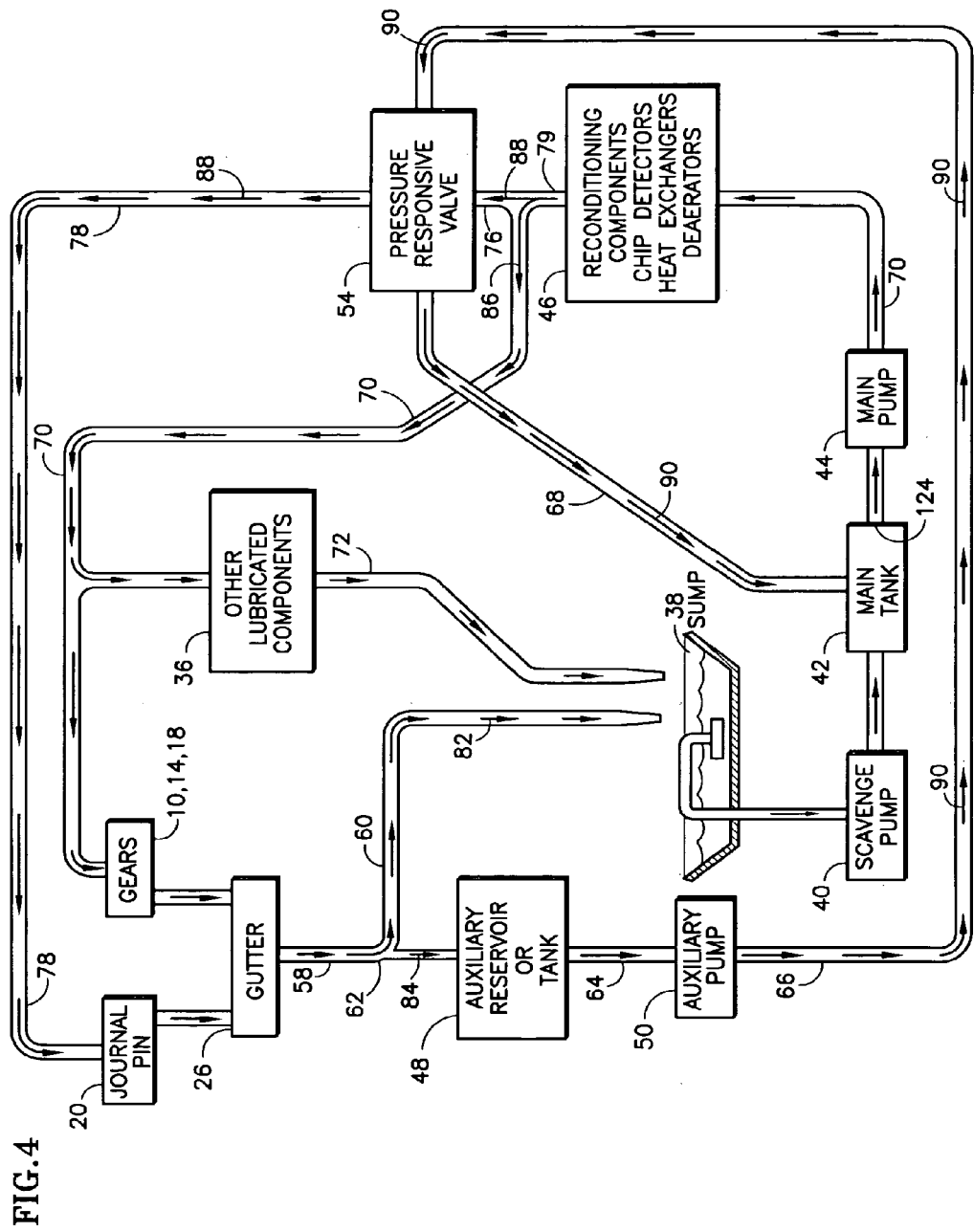
FIG. 4 is a schematic diagram showing a lubrication system in a normal state of operation, i.e. with the lubricant pressure at a normal level.

FIG. 4 schematically shows the relevant components of the above described gear train (gears 10, 14, 18, journal pin 20 and gutter 26), other engine components 36 requiring lubrication, and a lubrication system suitable for use with the gear train. The lubrication system includes a main system whose components include a sump 38, a scavenge pump 40 for scavenging lubricant from the sump, a main tank 42 for receiving lubricant from the scavenge pump, a main pump 44 for pumping lubricant from the main tank, and various lubricant reconditioning components such as chip detectors, heat exchangers and deaerators, collectively designated 46. The lubrication system also includes an auxiliary system whose components include an auxiliary lubricant tank or reservoir 48 and an auxiliary pump 50. The lubrication system also includes a pressure responsive valve 54.

An auxiliary tank supply conduit 58 extends from the gutter 26 to the auxiliary tank 48. The gutter serves as a source of lubricant for the tank. A main bypass line 60 branches from the supply conduit at a junction 62 and extends to the sump 38. An auxiliary tank discharge conduit 64 extends from the auxiliary tank to the auxiliary pump. An auxiliary pump discharge line 66 extends from the auxiliary pump to the pressure responsive valve. A main tank return line 68 extends from the valve 54 to the main lubricant tank 42. A lubricant delivery pathway 70 extends from the main pump 44 through the various lubricant reconditioning components 46 and ultimately to the gears 10, 14, 18 and other components 36. A lubricant return pathway 72 extends from the components to the sump 38. A portion 76 of the delivery pathway 70 leads to the pressure responsive valve 54. A journal pin delivery line 78 extends from the valve to the journal pins 20.

Figure 7:
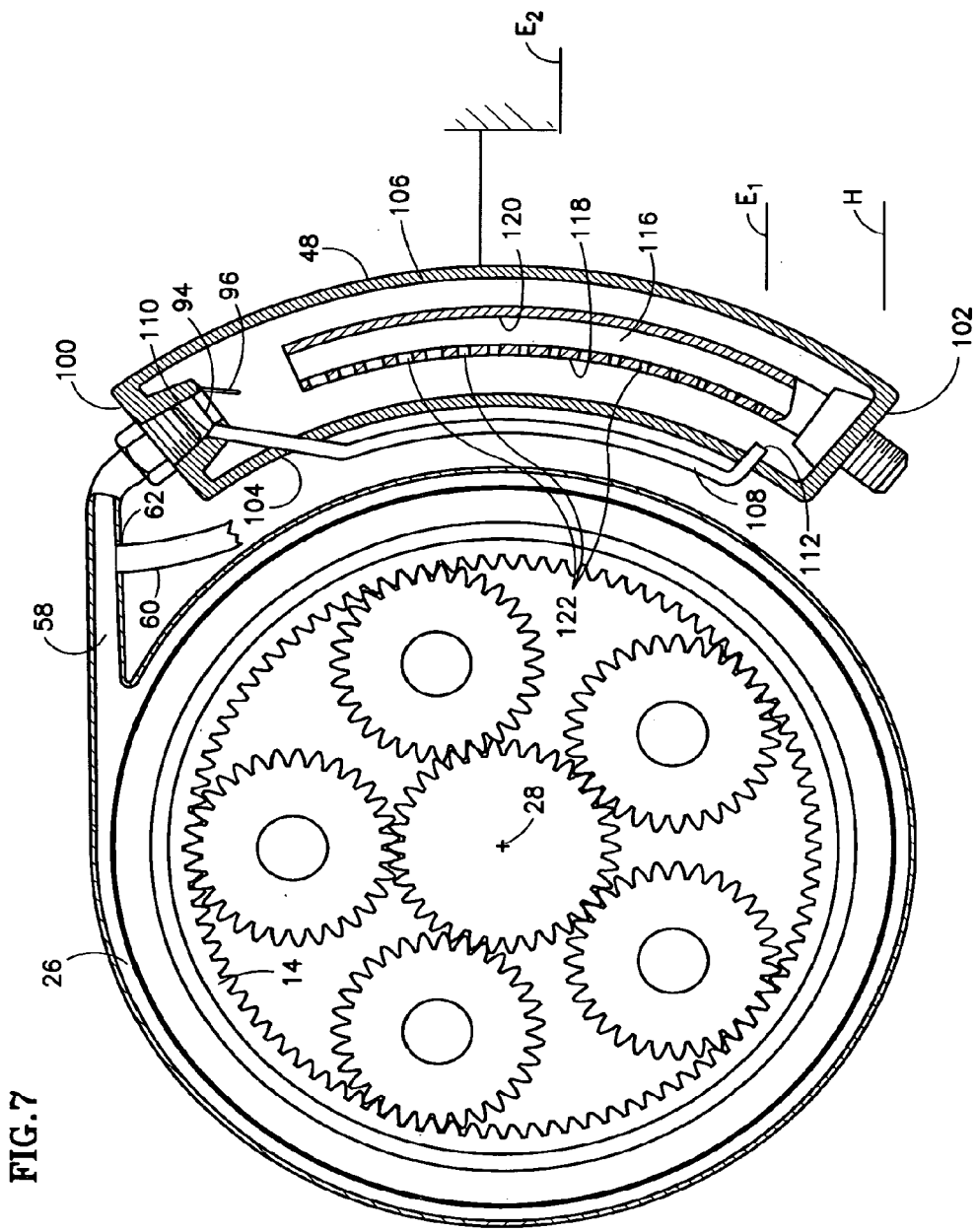
FIG. 7 is a schematic view showing an auxiliary lubricant tank with a bypass conduit and a discharge conduit for accommodating reduced-G operation.
Figure 8:
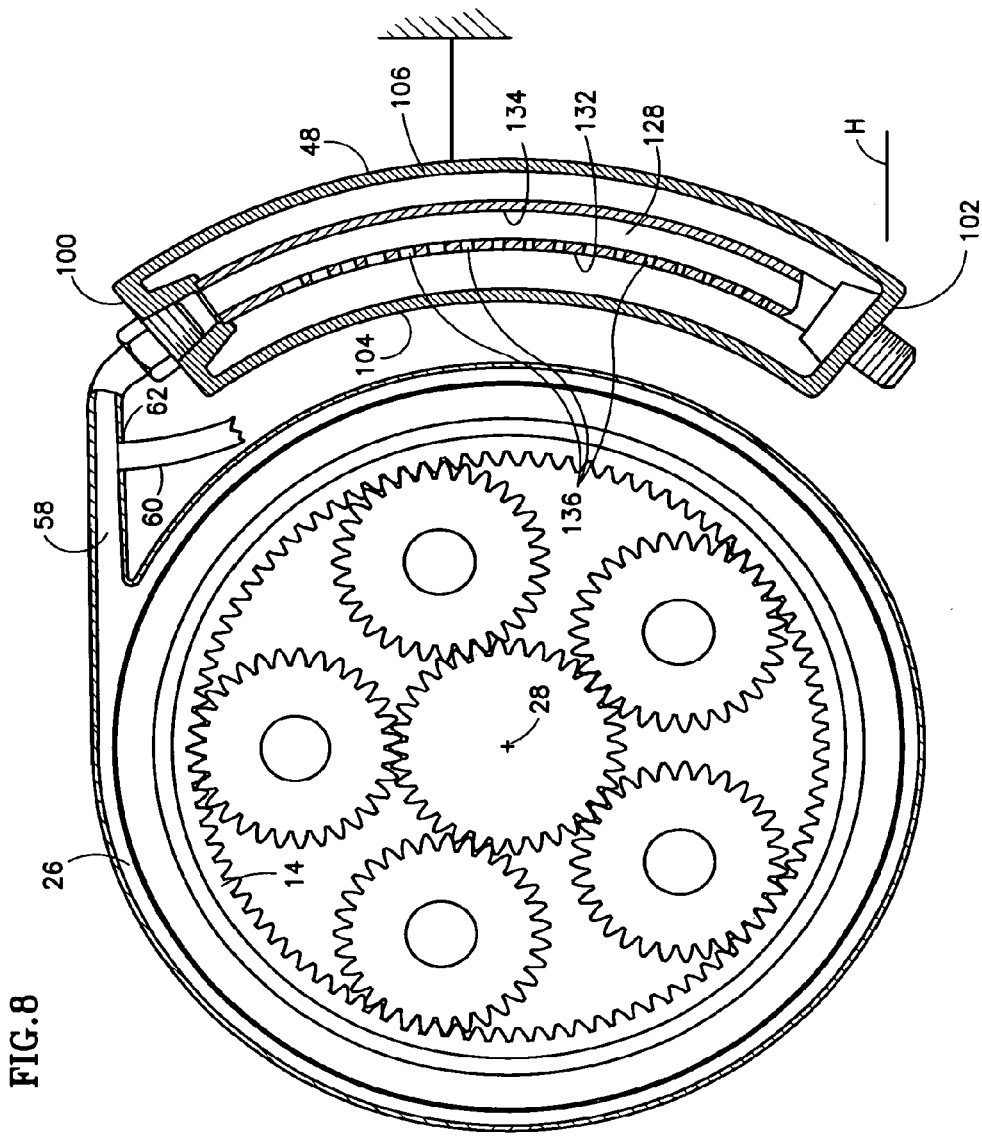
FIG. 8 is a schematic view showing an auxiliary lubricant tank with a continuous conduit extending through the tank without interruption for accommodating reduced-G operation.

It should be appreciated that the above description and the schematic illustration and are highly simplified in comparison to an actual lubrication system. For example, an actual system may have multiple lubricant conduits, lines, pathways, pumps, etc. corresponding to each of the components discussed above and illustrated The lubrication system is operable in both normal and abnormal states of operation. Those skilled in the art will appreciate that normal operation refers to the expected, trouble-free state of operation in which the lubrication system substantially meets its design specification. For example, the normal state is a state of operation in which the system delivers lubricant at the rates, temperatures, pressures, etc. determined by the designer so that the lubricated components, including the gears and journal pins, receive a quantity of lubricant enabling them to operate as intended. The skilled artisan will also appreciate that abnormal operation refers to a state of operation other than the normal state During normal operation, rotation of the gears expels lubricant radially outwardly, and with a high tangential velocity, into the lubricant recovery gutter 26. The supply conduit 58, which branches substantially tangentially off the gutter as seen in FIGS. 7 and 8, captures the expelled lubricant. A large portion 82 of the lubricant flows through the main bypass line 60 and returns to the sump 38. A smaller portion 84 of the lubricant flows into the auxiliary tank 48 to establish or replenish a reserve quantity of lubricant therein. The auxiliary pump 50 pumps lubricant from the tank to the pressure responsive valve 54. Concurrently, the scavenge pump 40 extracts lubricant from the sump 38 and delivers it to the main tank 42. The main pump 44 pumps the lubricant from the tank to the reconditioning components 46. Most of the reconditioned lubricant 86 then flows to the gears 10, 14, 18 and other components 36. The remainder 88 of the lubricant flows to the pressure responsive valve. The valve, responding to normal pressure in the lubrication system, directs this remaining lubricant 88 to the journal pins through the journal pin delivery line 78 and directs reserve lubricant 90 (received from the auxiliary pump) to the main tank 42 through the main tank return line 68.

Figure 5:
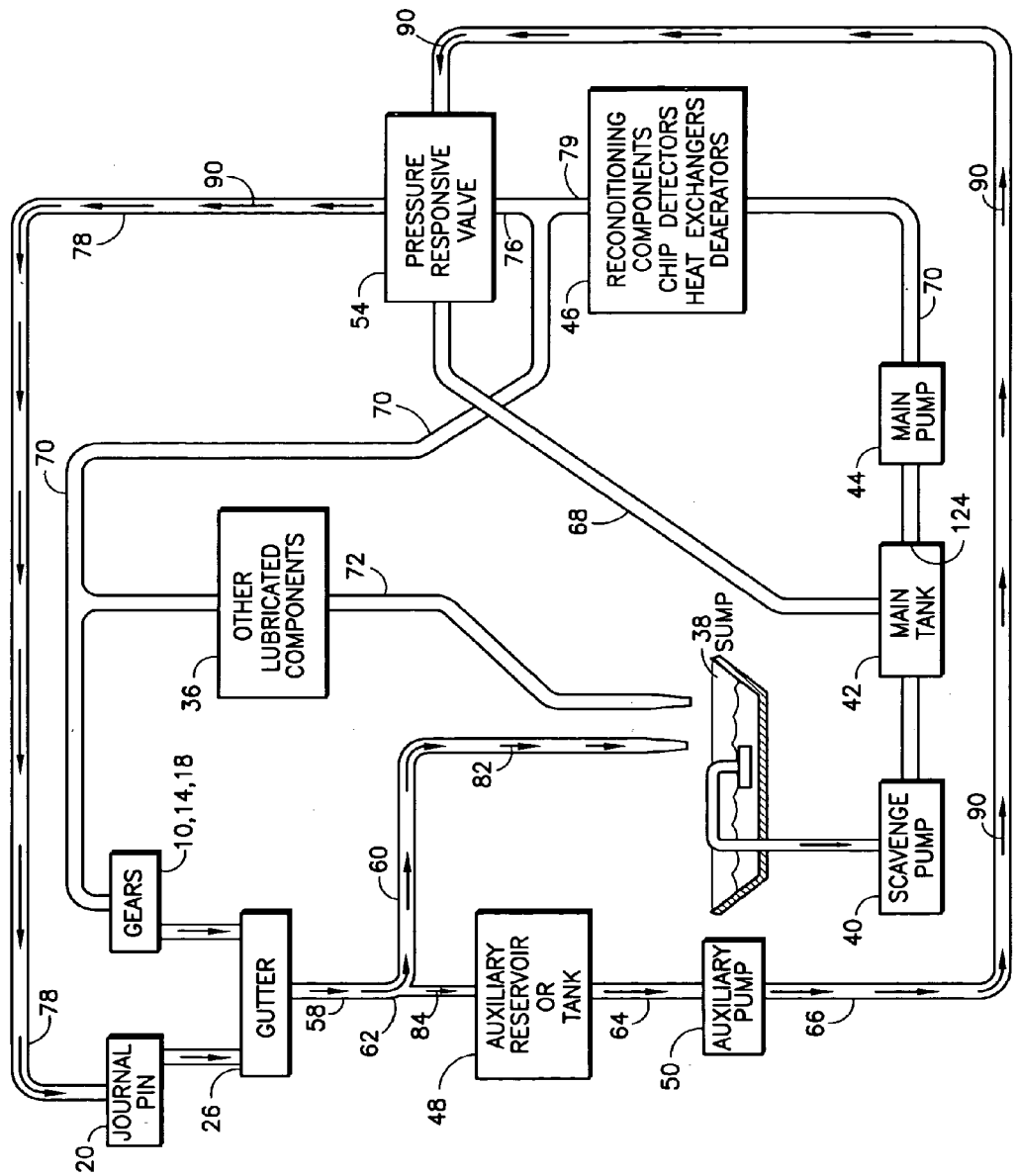
FIG. 5 is a schematic diagram showing the lubrication system of FIG. 4 shortly after the onset of an abnormal state of operation, i.e. with the lubricant pressure lower than a normal level.
Figure 6:
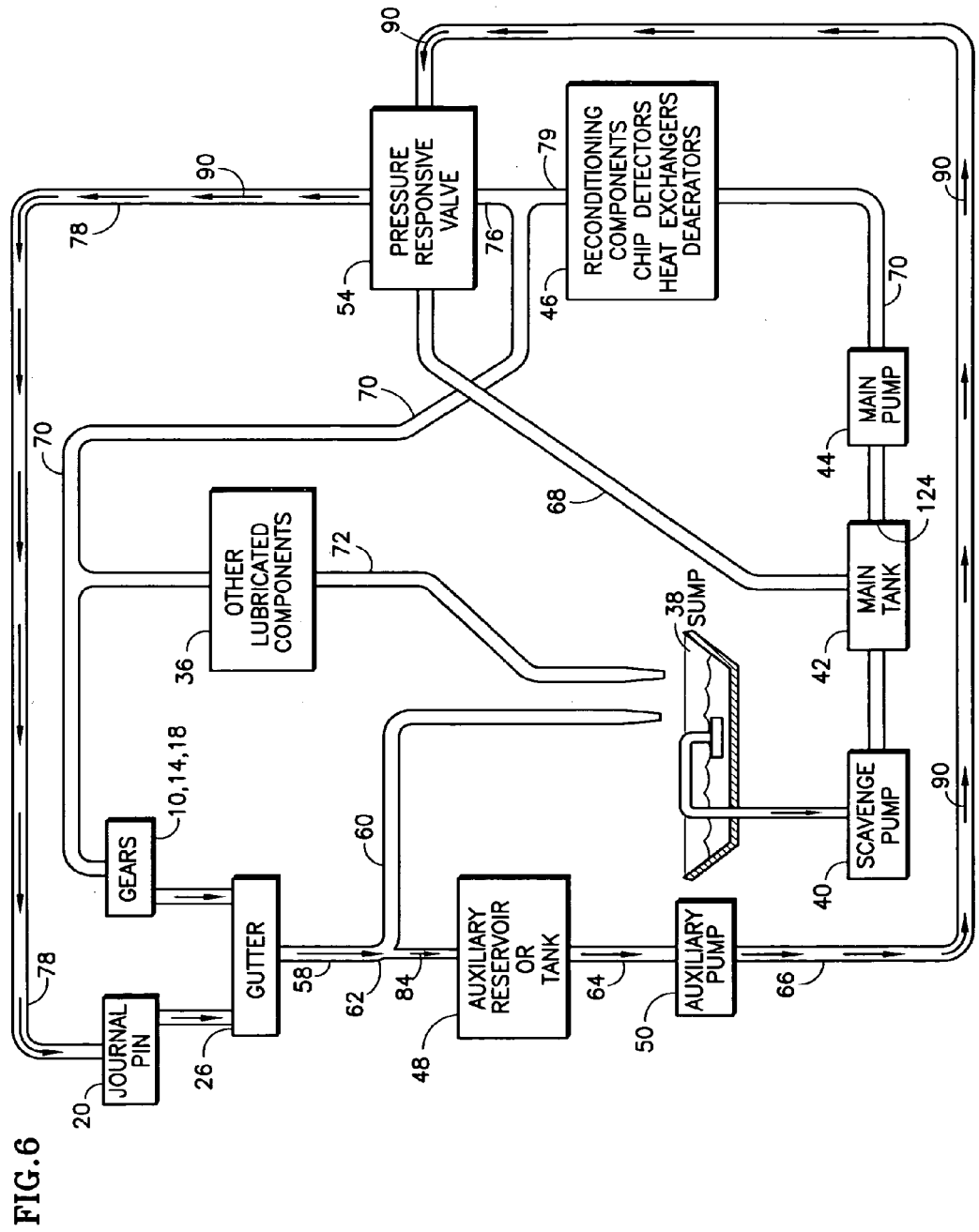
FIG. 6 is a schematic diagram similar to FIG. 5 showing the lubrication system at a later time.

Referring now to FIG. 5, immediately after the onset of abnormal operation (e.g. due to a severe leak, clog or malfunction of a system component) the lubricant pressure drops such that an unsatisfactorily reduced quantity of lubricant flows through the lubricant delivery pathway 70. In response to the abnormally low pressure, the pressure responsive valve 54 shunts the reserve lubricant 90 received from the auxiliary pump to the journal pins 20 to ensure that the pins receive lubricant, at least temporarily. The gear system at first continues to expel a large quantity of lubricant into the gutter. As with normal operation, a large portion 82 of the lubricant flows through the main bypass line 60 and returns to the sump 38. A smaller portion 84 of the lubricant flows to the auxiliary tank to at least partially replenish the lubricant being withdrawn by the auxiliary pump If the abnormally low lubricant pressure persists, the system reaches the state shown in FIG. 6. The quantity of lubricant circulating through the system is small enough that little or no lubricant backs up from the auxiliary tank and enters the main bypass line 60. Instead, nearly all of the limited quantity of lubricant flows to the auxiliary pump 50 and eventually back to the journal pins 20. This state of operation persists until the tank 48 is depleted and the flow rate from the gutter 26 is insufficient to replenish it Although the above-described system is satisfactory during normal-G operation, it may be desirable to extend such satisfactory operability to reduced-G conditions irrespective of whether the lubricant pressure is normal (FIG. 4) or is abnormally low (FIGS. 5 and 6). Reduced-G conditions include positive-G conditions materially less than 9.8 meters/sec./sec., particularly when such conditions result in an inability of the main lubricant system to satisfy the lubrication requirements of the gears, journal pins and other components requiring lubrication. Reduced-G conditions also includes non-positive-G conditions, i.e. zero-G and negative-G conditions. Reduced-G conditions can arise from aircraft maneuvers and/or aircraft orientation FIG. 7 illustrates the ring gear 14, gutter 26 and supply conduit 58, which extends substantially tangentially from the gutter. The main bypass line 60 branches from the supply conduit at the junction 62 upstream of a conduit outlet 94. An optional valve such as flapper valve 96 regulates lubricant flow from the outlet. The valve may be loaded, for example by a spring, to its closed position. The auxiliary tank 48 is mounted to a non-rotatable mechanical ground. The tank has a top 100, a bottom 102 and an arcuate profile with radially inner and outer boundaries 104, 106. A reduced-G bypass line 108 branches from the conduit downstream of the junction 62 and upstream of the conduit outlet 94. The bypass line has an inlet 110, and an outlet 112 inside the auxiliary tank. The outlet 112 is at a first elevation, $E_1$, preferably near the bottom of the tank The system also includes an auxiliary tank discharge conduit 116. The discharge conduit 116 has an arcuate profile with radially inner and outer boundaries 118, 120. A portion of the conduit resides within the tank. The resident portion has an opening along the conduit inner boundary for allowing lubricant transfer between the tank and the conduit. The opening may take any convenient form. For example the opening may be a single opening such as a hole or a slot extending along the conduit. The illustrated opening is an array of perforations 122. The perforations may all have the same area, however, as explained below, it may be desirable for the area of the individual perforations to decrease, or at least not increase, with decreasing elevation. The opening, whatever form it takes, is at least partially at a second elevation $E_2$ higher than the first elevation $E_1$. For example, in the illustrated, perforated variant, at least some of the perforations are higher than $E_1$ As used herein, "elevation" refers to distance or height above a reference height H no higher than the bottom of the tank 48 when the system is in the orientation seen in FIG. 7, i.e. an orientation representative of the engine or aircraft being on level ground or in straight and level flight During normal positive-G operation (G approximately equal to 9.8 m/sec./sec.) with normal lubricant pressure, lubricant enters the auxiliary tank, principally by way of the outlet 94, although some lubricant may enter the tank by flowing through the bypass line 108 and its outlet 112. During normal positive-G operation with abnormally low lubricant pressure, the valve 96, if present, may close so that lubricant still flowing through the conduit 58 enters the tank by way of the bypass line 108. Either way, the lubricant exits the tank through the auxiliary tank discharge conduit 116 after first passing through the opening represented by perforations 122

During reduced-G operation, particularly zero-G or negative-G, the lubricant pressure may be low enough that a reduced quantity of lubricant (including no lubricant) flows through the supply conduit 58. The low lubricant pressure may result from a malfunction in the lubrication system or it may occur because the reduced-G's have lifted lubricant away from the outlet 124 of the main tank (FIG. 4) in a system that is otherwise fully functional. The flapper valve 96, if present, closes. Lubricant still circulating in the system is impelled through supply conduit 58 as a result of the tangential velocity imparted to the lubricant by the rotation of the gears. That lubricant enters the tank by way of the bypass line 108 and its outlet 112. For negative-G operation, the lubricant will migrate toward the top of the tank. However because the array of perforations 122 is at least partially at an elevation $E_2$ higher than outlet elevation $E_1$, the lubricant can enter the discharge conduit 116 by way of the perforations 122. Because the lubricant migrates toward the top of the tank during negative-G operation, there will be a tendency for the auxiliary pump 50 to extract air from the bottom of the tank rather than lubricant from the top of the tank. This tendency can be partially counteracted if the perforations 122 are of decreasing area with decreasing elevation. The lubricant is encouraged to enter the discharge conduit partly because of the negative-G's and partly due to suction created by the auxiliary pump 50. Because the conduit is arcuate, the lubricant will tend to accumulate along the radially outer boundary 120 of the conduit so that it can be extracted by the pump 50. For zero-G operation, the system operates similarly except that the lubricant will tend to float and will not be able to enter the conduit as readily.

FIG. 8 illustrates the ring gear 14, gutter 26 and supply conduit 58, which extends substantially tangentially from the gutter. The main bypass line 60 branches from the conduit at the junction 62. The auxiliary tank 48 is mounted to a non-rotatable mechanical ground. The tank has a top 100, a bottom 102 and an arcuate profile with radially inner and outer boundaries 104, 106

The system also includes an auxiliary tank discharge conduit 128. The discharge conduit may be a component physically distinct from the supply conduit 58 and connected thereto by a fitting or other appropriate connection as shown. Alternatively, the discharge conduit may be an integral extension or continuation of the supply conduit 58, with the interface between the conduits 58, 128 being, for example, at the location where the continuous conduit penetrates into the auxiliary tank 48. The conduit extends continuously and without interruption through the tank The discharge conduit 128 has an arcuate profile with radially inner and outer boundaries 132, 134. A portion of the discharge conduit resides within the tank. The resident portion has an opening along the conduit inner boundary for allowing lubricant transfer between the tank and the conduit. The opening may take any convenient form. For example the opening may be a single opening such as a hole or a slot extending along the conduit. The illustrated opening is an array of perforations 136. The perforations may all have the same area. However, as explained above, it may be desirable for the area of the individual perforations to decrease, or at least not increase, with decreasing elevation in order to reduce the tendency for the pump 50 to extract air rather than lubricant during negative-G operation As used herein, "elevation" refers to distance or height above a reference height H no higher than the bottom of the tank 48 when the system is in the orientation seen in FIG. 8, i.e. an orientation representative of the engine or aircraft being on level ground or in straight and level flight.

During normal positive-G operation (G approximately equal to 9.8 m/sec./sec.) with normal lubricant pressure, lubricant delivered by supply conduit 58 flows through the perforations to establish a reserve quantity of lubricant in the auxiliary tank 48. Excess lubricant flows through the discharge conduit 128 to the auxiliary pump 50 (FIG. 4). During positive-G operation with abnormally low lubricant pressure, the quantity of lubricant circulating through the lubrication system is typically reduced relative to the normal quantity (in the limit, the reduced quantity may be zero). The reduced quantity flows into the discharge conduit and adds to residual lubricant in the tank and/or flows through the discharge conduit to the auxiliary pump During reduced-G operation, particularly zero-G or negative-G, the lubricant pressure may be low enough that a reduced quantity of lubricant (including no lubricant) flows through the supply conduit 58. The low lubricant pressure may result from a malfunction in the lubrication system or it may occur because the reduced-G's have lifted lubricant away from the outlet 124 of the main tank (FIG. 4) in a system that is otherwise fully functional. Lubricant still circulating in the system is impelled through supply conduit 58 as a result of the tangential velocity imparted to the lubricant by the rotation of the gears. That lubricant flows from the supply conduit 58 into the discharge conduit 128. For negative-G operation, any lubricant already in the tank migrates toward the top of the tank. The perforations 136 admit this lubricant to the discharge conduit to augment any lubricant arriving from the supply conduit 58. The lubricant in the tank is encouraged to enter the discharge conduit partly because of the negative-G's and partly due to suction created by the auxiliary pump 50. Because the conduit is arcuate, the lubricant will tend to accumulate along the radially outer boundary 134 of the conduit so that it can be extracted by the pump 50. For zero-G operation, the system operates similarly except that the lubricant will tend to float and will not be able to enter the conduit as readily Although this disclosure refers to specific embodiments of the lubrication system, it will be understood by those skilled in the art that various changes in form and detail may be made without departing from the subject matter set forth in the accompanying claims.

What is claimed is:
1. A lubrication system, comprising:
an auxiliary lubricant tank; and
a conduit having a first conduit portion residing outside the auxiliary lubricant tank, a second conduit portion interfacing with the auxiliary lubricant tank, and a third conduit portion residing inside the auxiliary lubricant tank, the third conduit portion having a plurality of openings for allowing lubricant transfer between the auxiliary lubricant tank and the conduit, the plurality of openings spaced from the second conduit portion, wherein the auxiliary lubricant tank is configured to discharge lubricant exclusively through the conduit, wherein the first conduit portion, the second conduit portion, and the third conduit portion are all directly connected to each other, wherein the third conduit portion extends without interruption through the auxiliary lubricant tank.

2. The lubrication system of claim 1 wherein the conduit extends axially and at least some of the plurality of openings extend radially through the third conduit portion.

3. The lubrication system of claim 1 wherein the tank has an arcuate profile.

4. The lubrication system of claim 1 wherein the conduit is the only outlet from the auxiliary lubricant tank.

5. The lubrication system of claim 1 wherein the conduit includes no more than one conduit.

6. The lubrication system of claim 1 wherein the conduit extends continuously and without interruption across the tank from a first wall of the tank to an opposing, second wall of the tank.

7. A lubrication system, comprising:
an auxiliary lubricant tank; and
a conduit extending without interruption through the auxiliary lubricant tank, a portion of the conduit residing within the tank having an opening for allowing lubricant transfer between the tank and the conduit.

8. The lubrication system of claim 7 wherein the opening is an array of perforations.

9. The lubrication system of claim 8 wherein the perforations each have an area that decreases with decreasing elevation.

10. The lubrication system of claim 7 wherein the resident portion of the conduit has an arcuate profile with radially inner and outer boundaries, the opening of the resident portion being along the radially inner boundary.

11. The lubrication system of claim 7 wherein the source of lubricant is a lubricant recovery gutter associated with a gear train.

12. The lubrication system of claim 7 wherein the opening facilitates lubricant admission into the conduit during reduced-G operation.

13. The lubrication system of claim 7, wherein the conduit spans from a first side to an opposing second side of the auxiliary lubricant tank.

14. A lubrication system for use with a gear train, the gear train including a ring gear and a gutter radially outboard of the ring gear, the lubrication system comprising:
an auxiliary lubricant tank; and
a conduit extending without interruption through the auxiliary lubricant tank, a portion of the conduit residing within the tank having an opening for allowing lubricant transfer between the tank and the conduit.

15. The lubrication system of claim 14 wherein the opening is an array of perforations.

16. The lubrication system of claim 15 wherein the perforations each have an area that decreases with decreasing elevation.

17. The lubrication system of claim 14 wherein the resident portion of the conduit has an arcuate profile with radially inner and outer boundaries, the opening of the resident portion being along the radially inner boundary.

18. The lubrication system of claim 14 wherein the gear train includes a sun gear radially inboard of the ring gear and a set of intermediate gears radially intermediate the sun gear and the ring gear, the intermediate gears being interconnected by a carrier.

19. The lubrication system of claim 14 wherein the sun and ring gears are rotatable about an axis and the carrier is non-rotatable about the axis.

20. The lubrication system of claim 14 wherein the sun gear and carrier are rotatable about an axis and the ring gear is non-rotatable about the axis.

21. The lubrication system of claim 14, wherein the conduit spans the auxiliary lubricant tank.

* * * * *